A. G. Shaver.

Eraser.

No. 805. Reissued. Aug. 30, 1859.

Witnesses
Wm. Vine
F. M. Hamm

A. G. Shaver

UNITED STATES PATENT OFFICE.

ARCHIBALD G. SHAVER, OF HARTFORD, CONNECTICUT.

ERASER AND PENCIL-SHARPENER.

Specification forming part of Letters Patent No. 23,196, dated March 8, 1859; Reissue No. 805, dated August 30, 1859.

*To all whom it may concern:*

Be it known that I, ARCHIBALD SHAVER, of the city and county of Hartford, and State of Connecticut, have invented certain new and useful improvements in the modes of constructing paper erasers and combining therewith a pencil sharpener and pointer; and I do hereby describe and ascertain said improvements and their application to the purposes intended.

My inventions consist in giving to the eraser a curved form, making its convex side with bevel edges, so as to serve as a burnisher or polisher. I also combine with this curved eraser a pencil-sharpener, by forming a cutting-edge on each side of the shank thereof and making a groove, serrated or roughened, for finishing the point of the pencil or sharpening it after the wood has been cut away.

Figure 1:
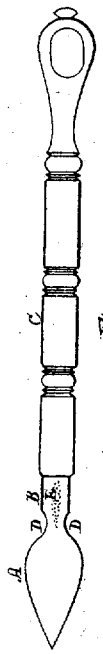
Figure 2:
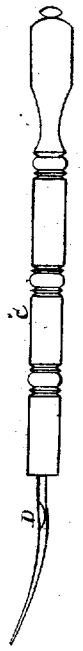

The construction of my eraser is as follows, referring to the accompanying drawings, in which Figure 1 represents a plan of the eraser, showing its outline. Fig. 2 is an edge view of the same.

It may be proper here to remark that the exact form here shown is not an essential one, so that the features that are hereinafter claimed are maintained.

The blade A of my eraser is formed of steel, and should be of the best quality. It is made thin toward its edges, of a heart-shape or approaching thereto, the shank projecting from its broadest end, as clearly shown in Fig. 1, in which A is the blade; B, the shank; C, the handle, which may be made of wood or other material, of any pattern convenient for the purpose.

Between the shank proper, B, and the blade A, I form curved indentations D, which I make sharp on the edges to serve as pencil-sharpeners, and on the flat portion of the shank, or some other convenient part of the blade, I indent a groove, E, which should be acutely triangular in its cross-section, and roughened, like a file, on its two surfaces to properly sharpen the point of a pencil fine by rubbing the lead-point along said groove and revolving the pencil at the same time.

The blade A, instead of being straight along its edges, has its point curved upward, as clearly seen in Fig. 2, and this curve constitutes the most important feature of my invention.

The curved or convex surface may be straight on its cross-section, except near its edges, which must be, in that case, beveled or chamfered off to raise the cutting and scraping edges above the surface, to enable it to be used as a polisher or burnisher, or the whole surface must be convex in cross-section as well as in longitudinal section, which will answer the same purpose of elevating the cutting-edges from the surfaces to be polished.

This eraser may be used as a paper cutter and folder, as well as for the purposes named. Its whole surface, except the groove E, should be highly finished and polished, like fine cutlery of other kinds.

Having thus fully described my eraser and pencil-sharpener, &c., what I claim therein as new, and desire to secure by Letters Patent, is—

1. The curved-blade eraser, as above specified, forming on one side a convex surface, substantially as and for the purposes set forth.

2. In combination with the curved-blade eraser, the pencil-sharpener and pointer, as described.

A. G. SHAVER.

Witnesses:
A. F. BULLS,
O. W. TURKE.